US010740375B2

(12) United States Patent
Jain

(10) Patent No.: US 10,740,375 B2
(45) Date of Patent: Aug. 11, 2020

(54) GENERATING ANSWERS TO QUESTIONS USING INFORMATION POSTED BY USERS ON ONLINE SOCIAL NETWORKS

(71) Applicant: Facebook, Inc., Menlo Park, CA (US)

(72) Inventor: Arpit Suresh Jain, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 595 days.

(21) Appl. No.: 15/002,226

(22) Filed: Jan. 20, 2016

(65) Prior Publication Data
US 2017/0206271 A1    Jul. 20, 2017

(51) Int. Cl.
G06F 17/00 (2019.01)
G06F 7/00 (2006.01)
G06F 16/338 (2019.01)
G06F 16/951 (2019.01)
G06F 16/33 (2019.01)

(52) U.S. Cl.
CPC ........ G06F 16/338 (2019.01); G06F 16/3344 (2019.01); G06F 16/951 (2019.01)

(58) Field of Classification Search
USPC ....................................................... 707/723
See application file for complete search history.

(56) References Cited

U.S. PATENT DOCUMENTS

| 5,918,014 | A | 6/1999 | Robinson |
| 6,539,232 | B2 | 3/2003 | Hendrey |
| 6,957,184 | B2 | 10/2005 | Schmid |
| 7,069,308 | B2 | 6/2006 | Abrams |
| 7,379,811 | B2 | 5/2008 | Rasmussen |
| 7,539,697 | B1 | 5/2009 | Akella |
| 7,599,937 | B2 * | 10/2009 | Dutta ................ G06F 21/6227 |
| 7,752,326 | B2 | 7/2010 | Smit |
| 7,783,630 | B1 | 8/2010 | Chevalier |
| 7,836,044 | B2 | 11/2010 | Kamvar |
| 7,890,471 | B2 * | 2/2011 | Fan ........................ G06F 16/81 |
|  |  |  | 707/673 |
| 7,904,458 | B2 * | 3/2011 | Koudas ............ G06F 16/24545 |
|  |  |  | 707/739 |

(Continued)

OTHER PUBLICATIONS

U.S. Appl. No. 14/455,798, filed Aug. 8, 2014, Lee-Goldman.

*Primary Examiner* — Pavan Mamillapalli
(74) *Attorney, Agent, or Firm* — Jordan IP Law, LLC

(57) ABSTRACT

In one embodiment, a method includes A method comprising, by one or more computing devices of an online social network, receiving, from a client system of a first user of the online social network, a post that is parsed to identify a query, identifying one or more topics and one or more query-domains matching the query, searching an answers-index to identify one or more query-answer sets responsive to the query and matching at least one of the identified topics and at least one of the identified domains, searching, for each entity identified in each query-answer set, a posts-index to identify one or more comments corresponding to the identified entity, calculating a score for each comment based on social signals associated with the comment, and sending, to the client system of the first user, a suggested-answers page including references to each comment having a score greater than a threshold score.

20 Claims, 18 Drawing Sheets

(56) References Cited

U.S. PATENT DOCUMENTS

| | | | |
|---|---|---|---|
| 7,953,720 B1* | 5/2011 | Rohde | G06F 16/951 |
| | | | 707/706 |
| 8,027,990 B1 | 9/2011 | Mysen | |
| 8,055,673 B2 | 11/2011 | Churchill | |
| 8,060,639 B2 | 11/2011 | Smit | |
| 8,082,278 B2 | 12/2011 | Agrawal | |
| 8,112,529 B2 | 2/2012 | Van Den Oord | |
| 8,135,721 B2 | 3/2012 | Joshi | |
| 8,145,636 B1 | 3/2012 | Jeh | |
| 8,180,804 B1 | 5/2012 | Narayanan | |
| 8,185,558 B1 | 5/2012 | Narayanan | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,280,885 B2* | 10/2012 | Cardie | G06F 40/20 |
| | | | 707/737 |
| 8,301,639 B1 | 10/2012 | Myllymaki | |
| 8,306,922 B1 | 11/2012 | Kunal | |
| 8,312,056 B1 | 11/2012 | Peng | |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |
| 8,538,960 B2 | 9/2013 | Wong | |
| 8,572,129 B1 | 10/2013 | Lee | |
| 8,578,274 B2 | 11/2013 | Druzgalski | |
| 8,595,297 B2 | 11/2013 | Marcucci | |
| 8,601,027 B2 | 12/2013 | Behforooz | |
| 8,606,721 B1 | 12/2013 | Dicker | |
| 8,639,725 B1 | 1/2014 | Udeshi | |
| 8,732,208 B2 | 5/2014 | Lee | |
| 8,751,521 B2 | 6/2014 | Lee | |
| 8,775,324 B2 | 7/2014 | Zhu | |
| 8,782,080 B2 | 7/2014 | Lee | |
| 8,782,753 B2 | 7/2014 | Lunt | |
| 8,832,111 B2 | 9/2014 | Venkataramani | |
| 8,856,167 B2* | 10/2014 | Higgins | G06F 16/3322 |
| | | | 707/769 |
| 8,868,590 B1 | 10/2014 | Donneau-Golencer | |
| 8,868,603 B2 | 10/2014 | Lee | |
| 8,898,226 B2 | 11/2014 | Tiu | |
| 8,909,637 B2 | 12/2014 | Patterson | |
| 8,914,392 B2 | 12/2014 | Lunt | |
| 8,918,418 B2 | 12/2014 | Lee | |
| 8,924,406 B2 | 12/2014 | Lunt | |
| 8,935,255 B2 | 1/2015 | Sankar | |
| 8,935,261 B2 | 1/2015 | Pipegrass | |
| 8,935,271 B2 | 1/2015 | Lassen | |
| 8,949,232 B2 | 2/2015 | Harrington | |
| 8,949,250 B1 | 2/2015 | Garg | |
| 8,949,261 B2 | 2/2015 | Lunt | |
| 8,954,675 B2 | 2/2015 | Venkataramani | |
| 8,983,991 B2 | 3/2015 | Sankar | |
| 9,043,888 B1* | 5/2015 | Ibel | G06Q 50/01 |
| | | | 726/7 |
| 9,460,207 B2* | 10/2016 | Yin | G06F 16/951 |
| 9,811,515 B2* | 11/2017 | Allen | G06F 40/169 |
| 9,946,747 B2* | 4/2018 | Barker | G06N 7/005 |
| 9,990,434 B2* | 6/2018 | Allen | G06F 16/9535 |
| 10,157,203 B2* | 12/2018 | Ajmera | G06F 16/24522 |
| 2002/0059199 A1 | 5/2002 | Harvey | |
| 2002/0086676 A1 | 7/2002 | Hendrey | |
| 2002/0196273 A1 | 12/2002 | Krause | |
| 2003/0154194 A1 | 8/2003 | Jonas | |
| 2003/0208474 A1 | 11/2003 | Soulanille | |
| 2004/0088325 A1 | 5/2004 | Elder | |
| 2004/0172237 A1 | 9/2004 | Saldanha | |
| 2004/0215793 A1 | 10/2004 | Ryan | |
| 2004/0243568 A1 | 12/2004 | Wang | |
| 2004/0255237 A1 | 12/2004 | Tong | |
| 2005/0091202 A1 | 4/2005 | Thomas | |
| 2005/0125408 A1 | 6/2005 | Somaroo | |
| 2005/0131872 A1 | 6/2005 | Calbucci | |
| 2005/0171955 A1 | 8/2005 | Hull | |
| 2005/0256756 A1 | 11/2005 | Lam | |
| 2006/0041597 A1 | 2/2006 | Conrad | |
| 2006/0117378 A1 | 6/2006 | Tam | |
| 2006/0136419 A1 | 6/2006 | Brydon | |
| 2006/0190436 A1 | 8/2006 | Richardson | |
| 2007/0174304 A1 | 7/2007 | Shrufi | |
| 2007/0277100 A1 | 11/2007 | Sheha | |
| 2008/0005064 A1 | 1/2008 | Sarukkai | |
| 2008/0033926 A1 | 2/2008 | Matthews | |
| 2008/0072180 A1 | 3/2008 | Chevalier | |
| 2008/0114730 A1 | 5/2008 | Larimore | |
| 2008/0183694 A1 | 7/2008 | Cane | |
| 2008/0183695 A1 | 7/2008 | Jadhav | |
| 2008/0270615 A1 | 10/2008 | Centola | |
| 2009/0006543 A1 | 1/2009 | Smit | |
| 2009/0054043 A1 | 2/2009 | Hamilton | |
| 2009/0094200 A1 | 4/2009 | Baeza-Yates | |
| 2009/0162824 A1* | 6/2009 | Heck | G06Q 10/10 |
| | | | 434/322 |
| 2009/0164408 A1 | 6/2009 | Grigorik | |
| 2009/0164431 A1 | 6/2009 | Zivkovic | |
| 2009/0164929 A1 | 6/2009 | Chen | |
| 2009/0197681 A1 | 8/2009 | Krishnamoorthy | |
| 2009/0228296 A1 | 9/2009 | Ismalon | |
| 2009/0259624 A1 | 10/2009 | DeMaris | |
| 2009/0259646 A1 | 10/2009 | Fujita | |
| 2009/0265326 A1 | 10/2009 | Lehrman | |
| 2009/0271370 A1 | 10/2009 | Jagadish | |
| 2009/0276414 A1 | 11/2009 | Gao | |
| 2009/0281988 A1 | 11/2009 | Yoo | |
| 2009/0299963 A1 | 12/2009 | Pippori | |
| 2010/0049802 A1 | 2/2010 | Raman | |
| 2010/0057723 A1 | 3/2010 | Rajaram | |
| 2010/0082695 A1 | 4/2010 | Hardt | |
| 2010/0125562 A1 | 5/2010 | Nair | |
| 2010/0125599 A1* | 5/2010 | Cheng | G06Q 30/02 |
| | | | 707/771 |
| 2010/0145771 A1 | 6/2010 | Fligler | |
| 2010/0153094 A1* | 6/2010 | Lee | G06F 16/3329 |
| | | | 704/9 |
| 2010/0179929 A1 | 7/2010 | Yin | |
| 2010/0197318 A1 | 8/2010 | Petersen | |
| 2010/0228744 A1 | 9/2010 | Craswell | |
| 2010/0235354 A1 | 9/2010 | Gargaro | |
| 2010/0321399 A1 | 12/2010 | Ellren | |
| 2011/0022602 A1 | 1/2011 | Luo | |
| 2011/0078166 A1 | 3/2011 | Oliver | |
| 2011/0087534 A1 | 4/2011 | Strebinger | |
| 2011/0137902 A1 | 6/2011 | Wable | |
| 2011/0184981 A1 | 7/2011 | Lu | |
| 2011/0191371 A1 | 8/2011 | Elliott | |
| 2011/0196855 A1 | 8/2011 | Wable | |
| 2011/0231296 A1 | 9/2011 | Gross | |
| 2011/0276396 A1 | 11/2011 | Rathod | |
| 2011/0313992 A1 | 12/2011 | Groeneveld | |
| 2011/0320470 A1 | 12/2011 | Williams | |
| 2012/0047147 A1 | 2/2012 | Redstone | |
| 2012/0059708 A1 | 3/2012 | Galas | |
| 2012/0136852 A1 | 5/2012 | Geller | |
| 2012/0151359 A1* | 6/2012 | Mysen | H04L 67/22 |
| | | | 715/736 |
| 2012/0166432 A1 | 6/2012 | Tseng | |
| 2012/0166433 A1 | 6/2012 | Tseng | |
| 2012/0179637 A1 | 7/2012 | Juan | |
| 2012/0185472 A1 | 7/2012 | Ahmed | |
| 2012/0185486 A1 | 7/2012 | Voigt | |
| 2012/0209832 A1 | 8/2012 | Neystadt | |
| 2012/0221581 A1 | 8/2012 | Narayanan | |
| 2012/0271831 A1 | 10/2012 | Narayanan | |
| 2012/0278127 A1 | 11/2012 | Kirakosyan | |
| 2012/0284329 A1 | 11/2012 | Van Den Oord | |
| 2012/0290950 A1 | 11/2012 | Rapaport | |
| 2012/0310922 A1 | 12/2012 | Johnson | |
| 2012/0311034 A1 | 12/2012 | Goldband | |
| 2012/0317088 A1 | 12/2012 | Pantel | |
| 2012/0331063 A1 | 12/2012 | Rajaram | |
| 2013/0024465 A1* | 1/2013 | Schiff | G06F 16/24578 |
| | | | 707/749 |

(56) References Cited

U.S. PATENT DOCUMENTS

| | | |
|---|---|---|
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254305 A1 | 9/2013 | Cheng |
| 2013/0282682 A1* | 10/2013 | Batraski ............... G06F 16/951 707/706 |
| 2013/0317808 A1* | 11/2013 | Kruel ..................... H04L 51/32 704/9 |
| 2014/0006416 A1 | 1/2014 | Leslie |
| 2014/0067535 A1 | 3/2014 | Rezaei |
| 2014/0122465 A1 | 5/2014 | Bilinski |
| 2014/0280236 A1* | 9/2014 | Faller .................. G06F 17/3053 707/749 |
| 2016/0125751 A1* | 5/2016 | Barker ................... G06F 19/00 434/322 |
| 2016/0171373 A1* | 6/2016 | Allen .................... G06F 16/907 706/50 |
| 2017/0097967 A1* | 4/2017 | Savliwala ............. G06Q 30/02 |

\* cited by examiner

540

Post P2="Any good action movies coming out in December?"

C4="Star Wars 7 will be out in December"

C5="Point Break too"

C6="Macbeth should be good"

C7="I want to see the Hateful Eight in November"

C8="Another vote for the Hateful Eight"

| Post P3="Please recommend a good dishwasher sold at Appliance World." |
| C9="I can recommend the Wash-o-matic." |
| C10="The Wash-o-matic." |

| Post P4="What are some good hotels near LaGuardia airport in New York City?" |
| C11="Try LaGuardia Suites. It's great." |

| Post P5="Who was the actor in American Sniper?" |
| C12="Bradley Cooper. He's a good actor." |

| Post P6="What are some news stories about terrorism in 2015?" |
| C13="The shooting down of the Russian civilian airplane." |

600

| Domain | Sub-domain | Topic | Entity |
|--------|-----------|-------|--------|
| Media | Movie | Action | Star Wars 7 |
| Media | Movie | December | Star Wars 7 |
| Media | Movie | Action | Point Break |
| Media | Movie | December | Point Break |
| Media | Movie | Action | Macbeth |
| Media | Movie | December | Macbeth |
| Media | Movie | Action | Hateful Eight |
| Media | Movie | December | Hateful Eight |

| Domain | Sub-domain | Topic | Entity |
|---|---|---|---|
| Products | Appliances | Dishwashers | Wash-o-matic |
| Places | Stores | Appliance World | Wash-o-matic |
| Places | Accomodations | Airport | LaGuardia Suites |
| Places | City | New York City | LaGuardia Suites |
| People | Actors | Male | Bradley Cooper |
| People | Actors | American Sniper | Bradley Cooper |
| Media | News | 2015 | Russian Airplane |
| Media | News | Terrorism | Russian Airplane |

| Entity | Comments |
| --- | --- |
| Round Table Pizza | C1="Round Table Pizza is great!"<br>C3="Try Round Table! I like it!" |
| Pizza Chicago | C2="I like Pizza Chicago." |
| Star Wars 7 | C4="Star Wars 7 will be out in December" |
| Point Break | C5="Point Break too" |
| Macbeth | C6="Macbeth should be good" |
| Hateful Eight | C7="I want to see the Hateful Eght" |
| Hateful Eight | C8="Another vote for the Hateful Eight" |

| Entity | Comments |
|---|---|
| Wash-o-matic | C9="I can recommend the Wash-o-matic." |
| Wash-o-matic | C10="The Wash-o-matic. It's sold at Appliance World." |
| Appliance World | C10="The Wash-o-matic. It's sold at Appliance World." |
| LaGuardia Suites | C11="Try LaGuardia Suites. It's great." |
| Bradley Cooper | C12="Bradley Cooper. He's a good actor." |
| Russian airplane | C13="The shooting down of the Russian airplane." |

FIG. 7B

GENERATING ANSWERS TO QUESTIONS USING INFORMATION POSTED BY USERS ON ONLINE SOCIAL NETWORKS

TECHNICAL FIELD

This disclosure generally relates to using information posted by users to generate answers to questions in a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may find answers to questions posted by users of an online social network, such as requests for recommendations, by searching a corpus of question and answer threads. Question and answer threads may be created when users ask questions, e.g., by posting the questions in status updates, and other users post answers in comments on the status updates. These posts and comments may be stored and indexed for use in answering subsequent questions on similar topics. Thus, although the intent of the user may be to post a question to be answered by other users, the question or a similar one has likely been asked in the past, and, the posting user need not wait for an answer from a friend if the answer can be found in an existing public post.

In particular embodiments, the questions may include requests for recommendations related to one or more topics. Each topic in a question may represent a product, vendor, service (e.g., restaurants, movies, dishwashers), location, an attribute of any of those, or anything else for which people may request recommendations. An example question may be "What are some good pizza places in Palo Alto?" The answers to a question may include relevant comments, such as recommendations or reviews, which refer to entities that represent answers to questions. Similar previously-asked questions may be identified by searching previous question-answer threads for questions that contain the topics "pizza" and "Palo Alto." For example, if a user previously posted the comment "I like Pizza Chicago" in response to a post that asked a question containing the topics "pizza" and "Palo Alto", then the entity "Pizza Chicago" or the comment that refers to "Pizza Chicago" may be recommended as an answer to the request for recommendations. The entity may be presented as a search result, and multiple search results may be ranked and personalized, e.g., based on attributes of the user who posted the question.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 5F-5I illustrate example lists representing comment threads in which the posts ask questions.

FIGS. 6A and 6B illustrate example answers-indexes that map domains and topics to entities referenced in comments on posts that are related to the domains and topics.

FIGS. 7A and 7B illustrate example posts-indexes that map entities to comments that reference the entities.

DESCRIPTION OF EXAMPLE EMBODIMENTS

System Overview

Figure 1:
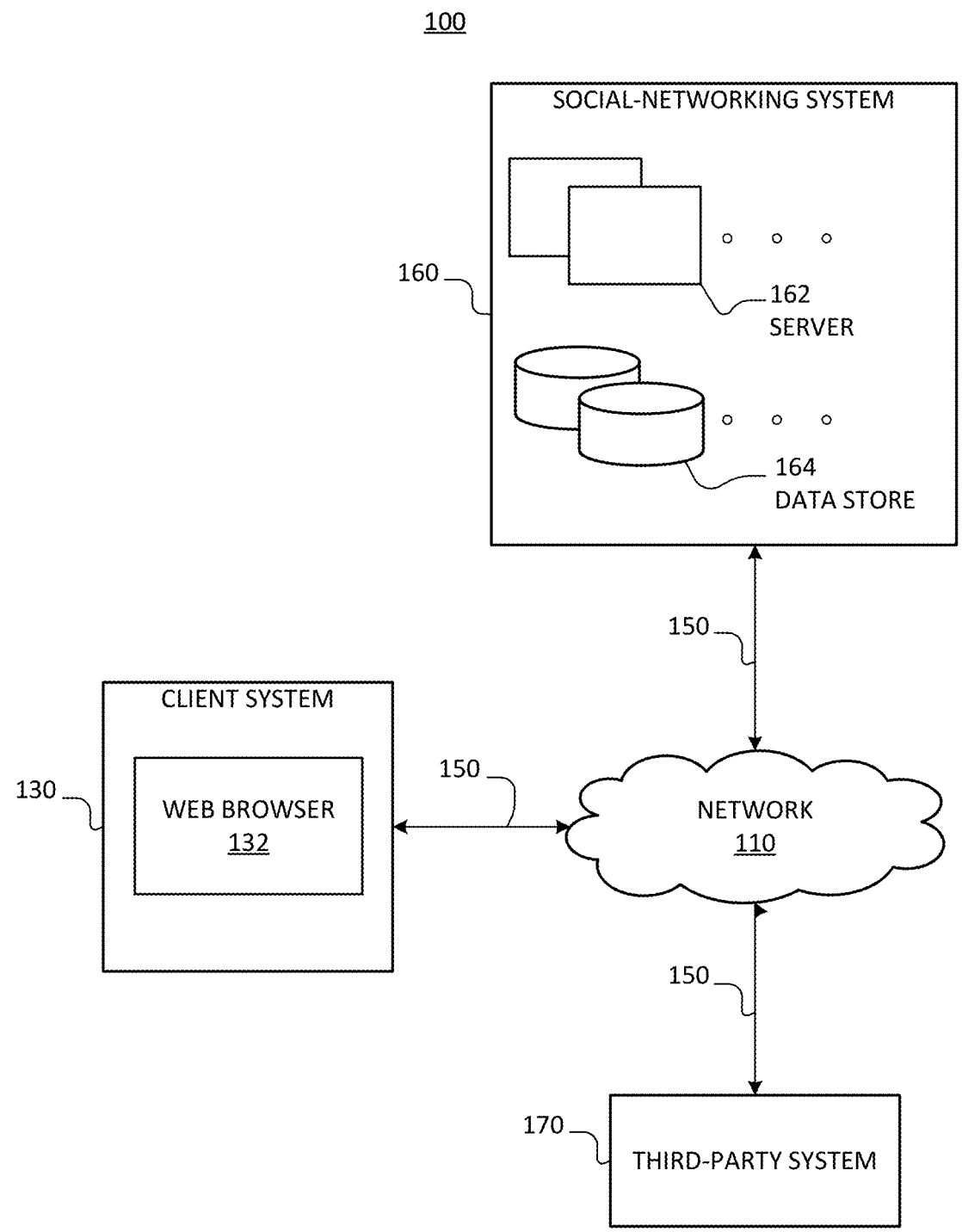
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
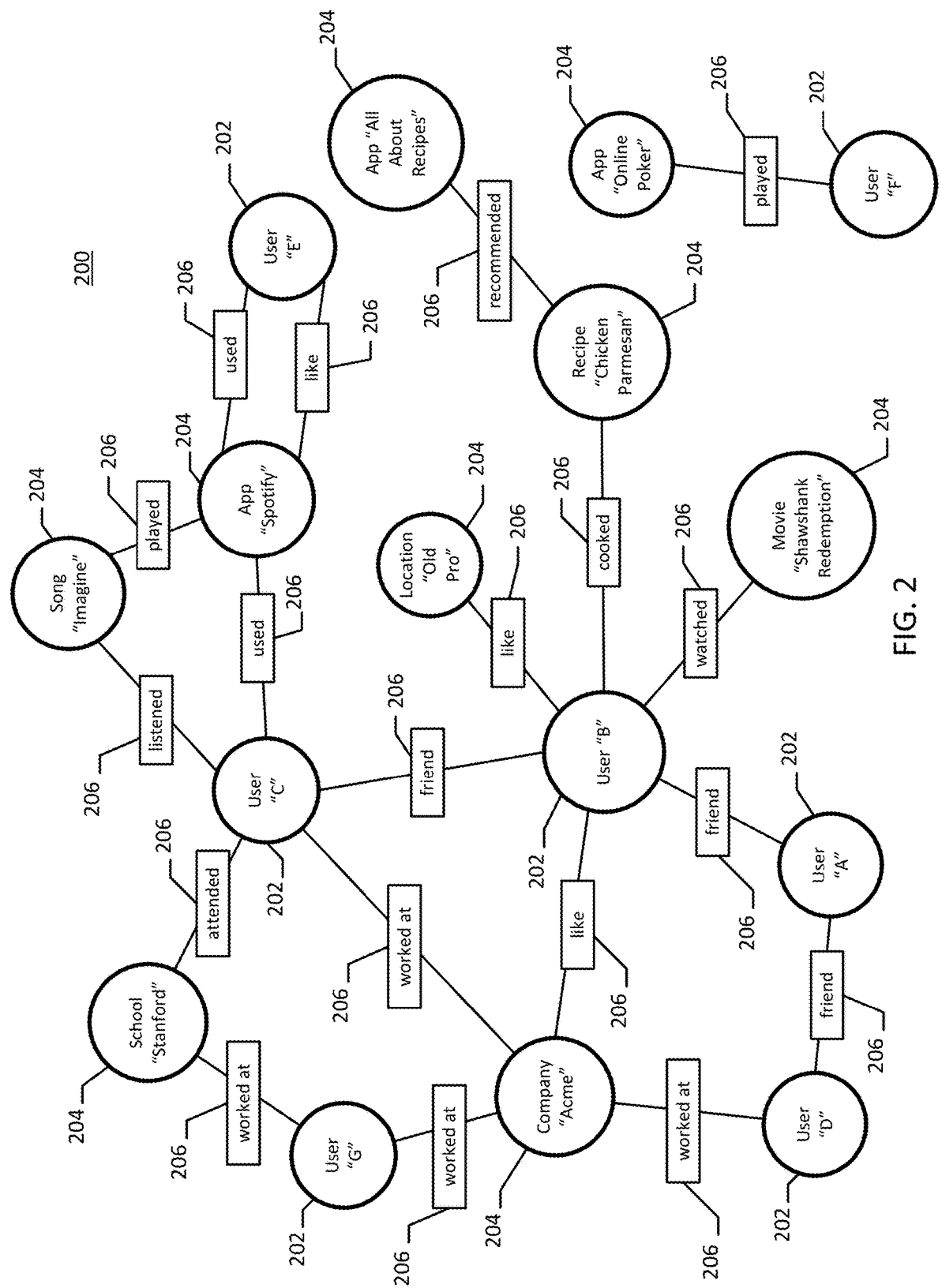
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Questions and Answers from Comments

In particular embodiments, the social-networking system 160 may find answers to questions posted by users of an online social network, such as requests for recommendations, by searching a corpus of question and answer threads. Question and answer threads may be created when users ask questions, e.g., by posting the questions in status updates, and other users post answers in comments on the status updates. These posts and comments may be stored and indexed for use in answering subsequent questions on similar topics. Thus, although the intent of the user may be to post a question to be answered by other users, the question or a similar one has likely been asked in the past, and the posting user need not wait for an answer from a friend if the answer can be found in an existing public post.

In particular embodiments, the questions may include requests for recommendations related to one or more topics. Each topic in a question may represent a product, vendor, service (e.g., restaurants, movies, dishwashers), location, an attribute of any of those, or anything else for which people may request recommendations. An example question is "What are some good pizza places in Palo Alto?" The answers to a question may include relevant comments, such as recommendations or reviews, which refer to entities that represent answers to questions. Similar previously-asked questions may be identified by searching previous question-answer threads for questions that contain the topics "pizza" and "Palo Alto." For example, if a user previously posted the comment "I like Pizza Chicago" in response to a post that asked a question containing the topics "pizza" and "Palo Alto", then the entity "Pizza Chicago" or the comment that refers to "Pizza Chicago" may be recommended as an answer to the request for recommendations. The entity may be presented as a search result, and multiple search results may be ranked and personalized, e.g., based on attributes of the user who posted the question.

In particular embodiments, an answer corpus may be generated and indexed based on existing posts and comments. The answer corpus may be generated periodically, e.g., by a process that executes daily, hourly, or at other intervals. Questions posed by users in posts such as status updates or received in a search query user interface may be answered in an automated way by searching the answer corpus for existing questions related to topics specified in the status updates or in other search queries.

The terms "post" and "comment" may both refer to a content object provided by a user to the social-networking system 160, e.g., a message containing text and/or graphics. The posting user, e.g., the user who submits the post or comment to the social-networking system 160, may be referred to as the author of the post or comment. Text may be extracted from the post or comment for use as questions or answers. Posts and comments may be stored in a data store 164 and presented to the author and to other users, subject to privacy settings. In particular embodiments, privacy settings may allow a user to opt-in or opt-out of having their posts or comments used as suggested answers. A post may be followed by one or more comments in a comment thread. The term "post" may refer to both posts and comments, and "comment" may refer to both posts and comments as well. Both posts and comments may be "posted", e.g., submitted to the social-networking system 160.

Figure 3A:
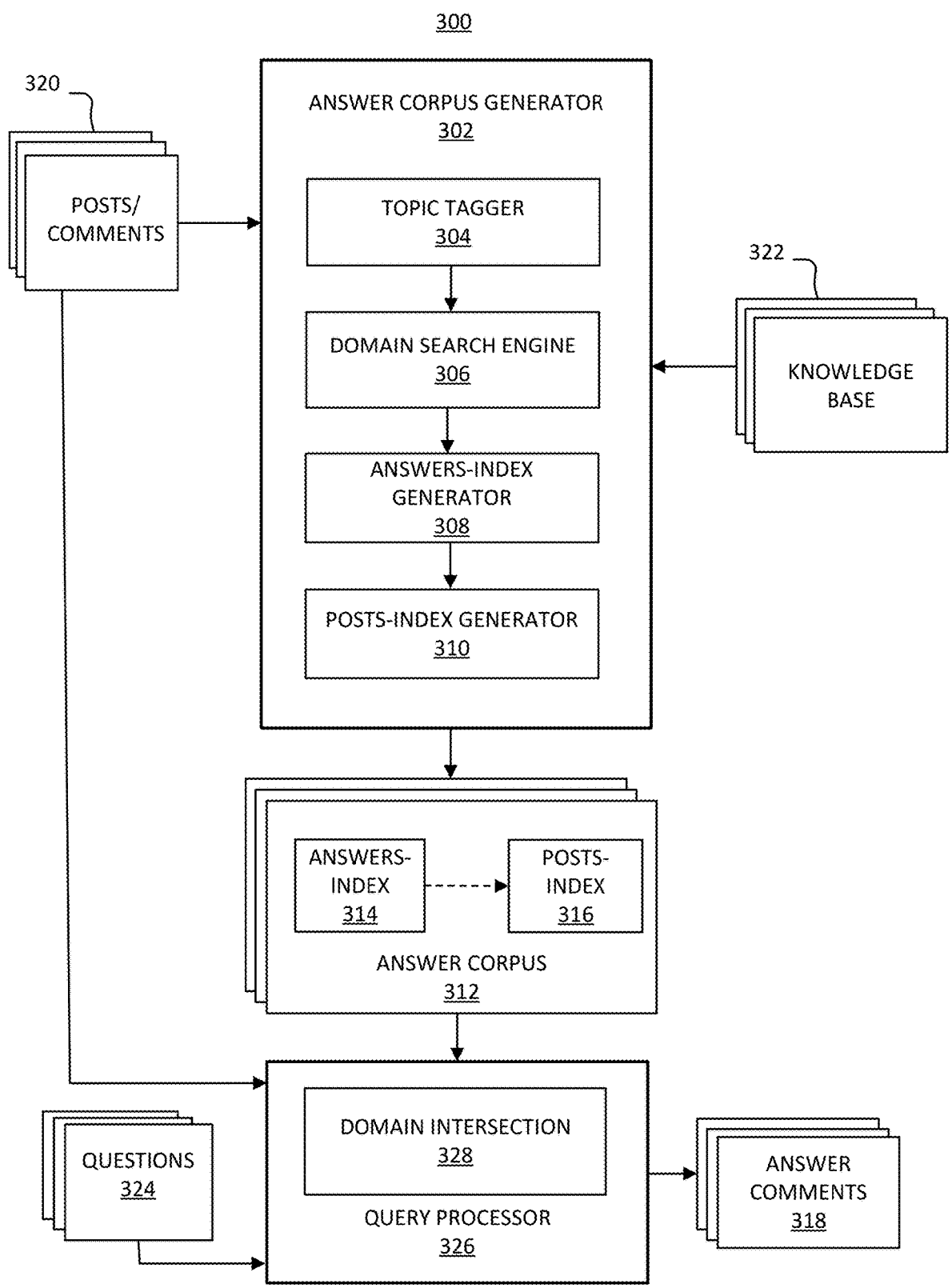
FIG. 3A illustrates an example answer generator for generating answers to questions by searching for relevant existing posts.

The term "topic" may be used herein to refer to a word or phrase. Topics may be extracted from questions. One or more topics may be associated with an entity. A topic may be mapped to an entity name, e.g., by searching a social graph for a node having a name that matches the topic. For example, the movie name "Star Wars 7" may have both a topic associated with it, and a node 204 in social graph 200. However, the news story name "Paris Terrorist Attacks" may have a topic, but no corresponding node 204, and no corresponding entity. Further, a topic may be associated with text, e.g., in a post or comment, that does not contain the topic. For example, the post "john boyega was great!" may have the topics "Star Wars 7" and "John Boyega", which may be identified, for example, by a topic tagger 304, as shown in FIG. 3A. For clarity of explanation, the term "entity" may be used herein to refer to answers to questions. Thus, a question may specify topics, and an answer may specify entities related to the question's topics. Entities may also have entity types, and an entity's type may correspond to a domain and sub-domain, as described below with reference to FIG. 3A.

FIG. 3A illustrates an example answer generator 300 for generating answers to questions by searching for relevant existing posts. The answer generator 300 includes an answer corpus generator 302 for generating an answer corpus 312 based on existing comment threads, and a query processor 326 for querying the answer corpus 312 to identify and retrieve answers to questions. In particular embodiments, to generate the answer corpus 312, the social-networking system 160 may identify existing posts and/or comments 320 that contain questions. The answer corpus generator 302 may be a server-side task, e.g., may execute at times independent when questions 324 are received, and may execute periodically, e.g., daily, hourly, or at other intervals.

In particular embodiments, the social-networking system 160 may determine, using natural-language processing, that the query is a question in a natural language syntax. The answer corpus generator 300 may use Natural-Language Processing (NLP)-based parsing to determine which of the existing posts and/or comments 320 contain questions. In particular embodiments, the social-networking system 160 may identify one or more topics of the query by using a topic tagger 304 to identify the topics based on the query. For example, one of the existing posts 320 may include the text "Guys, what are some good pizza places in Palo Alto?" The topic tagger 304 may strip out stop words such as "Guys", "what", "are", "the", and "in", and identify words that represent topics, such as "pizza" and "Palo Alto." In particular embodiments, the social-networking system 160 may receive the query by receiving a post that includes the query. Although this disclosure describes identifying queries in a particular manner, this disclosure contemplates identifying queries in any suitable manner In particular embodiments, the answer corpus generator 322 may retrieve the existing posts 320 from a data store 164, or may receive existing posts 320 as input from a user. An NLP question recognition process may use the presence of keywords such as "recommendation" or "places to visit", punctuation (e.g., question marks), the length of text (e.g., shorter text is likely to be a question), and other attributes of the posts 320 to determine whether each post 320 contains a question. For example, for the existing post that has the text "Guys, what are some good pizza places in Palo Alto," the NLP recognition process may determine that the text is a question based on the words "what are some good." In particular embodiments, the answer corpus generator 302 may retrieve comments on the posts that contain questions. Optionally, NLP parsing may then be used to determine whether the comments contain text in the form of answers. Comments that are not in the form of answers may be excluded from, and comments that are determined to contain answers may be included in, the answer corpus, as described below.

In particular embodiments, the social-networking system 160 may identify one or more topics and one or more query-domains matching the query. To focus the search of the answer corpus on relevant posts and comments, one or more query-domains of the topics extracted from the question may be determined and used as additional search criteria (e.g., in addition to the extracted topics). For example, a search of existing question posts for the term "pizza" may return numerous posts containing questions that mention pizza in contexts other than pizza restaurants. A query-domain may include a domain and a sub-domain. Therefore, a domain and sub-domain, such as "Places" and "Restaurants", respectively, or "Foods" and "Italian", respectively, may be identified for the topic "pizza". The existing question posts (or an index based on the posts) may then be searched for mentions of the topic "pizza" in the same domain and sub-domain as the mentions of the topic "pizza" in the question for which an answer is being sought. Thus, a comment such as "I like McDonalds" may be excluded because the question asks about pizza restaurants, and McDonalds is not a pizza restaurant. As an example and not by way of limitation, the domains of a question may be domain=Places, sub-domain=Restaurants, and the topic may be Pizza. In contrast, the domains of a McDonalds entity may be domain=Places, sub-domain=Restaurants, topic=Fast food, which is different from the question because of the differing topics. Thus the entity McDonalds is not included in the search results for the question about pizza restaurants. Similarly, restaurants not located in Palo Alto may be excluded, because the topic of the question indicates restaurants located in Palo Alto (e.g., domain=Places, sub-domain=Cities, topic=Palo Alto). Although this disclosure describes identifying particular topics and domains in a particular manner, this disclosure contemplates identifying any suitable topics or domains in any suitable manner.

In particular embodiments, the topic tagger 304 or a domain search engine 306 may identify domains of the extracted topics. The term "domain" as used herein may refer to a logical grouping of content objects related to a particular category. A domain may be, e.g., places, people, photos, events, and so on. A particular sub-domain may be, e.g., movie, restaurant, landmark, and so on. A sub-domain may refer to a grouping of content objects related to a sub-category of the domain. For example, "restaurant" may be a sub-domain of the domain "places." As another example, "celebrity" may be a sub-domain of the domain "people." As another example, a domain "Places" and sub-domain "Restaurants" may be identified for the topic "pizza" by the domain search engine 306. A domain may correspond to an entity type, e.g., "Places" may be an entity type that corresponds to the "Places" domain. Sub-domains such as "Restaurants" may correspond to categories within an entity type.

In particular embodiments, the social-networking system 160 may identify the query-domains by searching a knowledge base that associates topics with query-domains. The topic tagger 304 or domain search engine 306 may access a knowledge base 322, e.g., based on Wikipedia, Freebase, or the like, from which the topic tagger 304 or domain search engine 306 may retrieve information about topics. For example, the domain search engine 306 may search the knowledge base 322 to identify topics referred to in questions. The topic tagger 304 or other search process may use the knowledge base to identify the domain and sub-domain of "Palo Alto" by searching for the topic "Palo Alto" in the knowledge base 322. The identified domain may be "Places" and the sub-domain may be "City", for example.

In particular embodiments, the social-networking system 160 may generate indexes for use in efficiently retrieving answers based on topics identified in received questions. Two indexes, an answers-index 314 and a posts-index 316, may be created, e.g., offline, based on the posts/comments 320 and the entities they refer to. The indexes may be constructed by a server process that scans the posts. The indexes may include an answers-index 314 that maps from domain, sub-domain, and topic of a question post to the corresponding entity mentioned in a comment on the post. The comment may be an answer to a question asked in the post, and the entity may be the answer to the question. For example, the question may be "Good pizza places in Palo Alto?" The topic may be a topic identified based on in the post, e.g., "pizza". The domain and sub-domain may be derived (by the domain search engine 306, for example) from the topic of the post that asked the question. The entity may be identified by an entity name extracted from a comment on the post. For example, for the comment "Round Table Pizza has great service," the entity name Round Table Pizza may be extracted and associated with the domain, sub-domain values Places, Restaurants and the topic Pizza.

The posts-index 316 may map from entity to comment identifiers. Comment identifiers may be used to retrieve posts, comment text, and author information associated with the comment. The entity name extracted from the comment and the comment's ID can be used to create a posts-index entry. The comment itself and the comment's author can be determined from the comment ID, and need not be stored in the posts-index.

In particular embodiments, the social-networking system 160 may receive, from a client system 130 of a first user of the online social network, a post inputted by the first user. The social-networking system 160 may parse the post to identify a question associated with the post. When a question 324 is received, e.g., in the form of a status update, the query processor 326 may search the answers-index 314 and posts-index 316 to find entities having the same domain, sub-domain, and topic as the question. Comments 318 on the found entities may then be retrieved and presented as search results. The domain intersection component 328 may verify that each entity to be used as a search result has domain, sub-domain, and topic tuples that match the domain, sub-domain, and topic tuples for each topic identified in the question. In particular embodiments, as described below, only entities for which all the (domain, sub-domain, and topic) tuples associated with the entity match corresponding tuples in the answers-index 316 are included in the search results. Alternatively, entities for which a subset of the tuples match may be included in search results, but with a reduced score, e.g., an entity for which three of the five tuples match, may have a lower score than an entity for which all of the tuples match.

In particular embodiments, the social-networking system 160 may search an answers-index to identify one or more query-answer sets responsive to the query, each query-answer set matching at least one of the identified topics and at least one of the identified domains, where each query-answer set identifies one or more entities. When a question is received, the social-networking system 160 may use the answers-index 314 to search the corpus for entities that were mentioned in comments posted in response to previously-asked questions that have the same domain, sub-domain, and topic as the question 324 by identifying one or more topics in the question, identifying a domain and sub-domain for each of the topics, and searching the answers-index 314 for entities that match. The posts-index 316 may then be used to find the posts and comments associated with the identified entities. Only posts and comments that are accessible to the user (e.g., visible to the user as specified by privacy settings associated with the post or comment) who posted the query may be searchable. Although this disclosure describes searching for answers to queries in a particular manner, this disclosure contemplates searching for answers to queries in any suitable manner.

As an example and not by way of limitation, when a post is received from a user, e.g., "Any recommendations for pizza in Palo Alto?" the following steps may be performed. The topic tagger 304 may identify the words "pizza" and "Palo Alto" as topics. The domain search engine 306 may map the word "pizza" to domain=Places, sub-domain=Restaurant, and "Palo Alto" may be mapped to domain=Places, sub-domain=City. This example uses the same topics and words used in the index construction example above, but in practice, the answers-index may contain numerous different values, and each question may specify one or more (domain, sub-domain) pairs for which the answers-index is to be searched.

Next, to identify comments that answer the questions, the answers-index 314 may be queried for entities associated with domain=Food, sub-domain=Pizza. This query may return entities such as Round Table Pizza and Pizza Chicago. The answers-index 314 also may be queried for domain=Location, sub-domain=Palo Alto, which may return entities such as Sancho's Mexican Restaurant and Round Table Pizza.

In particular embodiments, each query-answer set may match all of the identified topics and identified domains. An intersection of the returned entities may be determined, e.g., entities that are (1) associated with Pizza and (2) located in Palo Alto. The intersection may be determined by selecting entities having (domain, sub-domain, topic) tuples that match all the (domain, sub-domain, topics) tuples in the question. The tuples are (domain=Places, sub-domain=Restaurants, topic=pizza) and (domain=Places, sub-domain=City, and topic=Palo Alto) in this example. The result in this example is "Round Table Pizza." Sancho's is not included in the result because Sancho's is not associated with the tuple (domain=Places, sub-domain=Restaurants, topic=pizza). This intersection may be generated by the domain intersection component 328.

In particular embodiments, the social-networking system 160 may search, for each entity identified in each query-answer set, a posts-index 316 to identify one or more comments corresponding to the identified entity. The post index 316 may be queried to identify comments associated with the entities in the intersection. The search result is thus the comment with ID 0001 ("Great service"), which is associated with the entity "Round Table Pizza." For each search result, information may be retrieved, such as the entity, author, location of the author, star rating of the entity, specific food domain of a restaurant, and so on. Although this disclosure describes identifying comments that correspond to entities in a particular manner, this disclosure contemplates identifying comments that correspond to entities in any suitable manner.

In particular embodiments, the social-networking system 160 may calculate a score for each comment based at least on a number of social signals associated with the comment. The score may be calculated at step 850 of FIG. 8. The search results, e.g., the identified comments, may be ranked into a sorted order using the score associated with each comment. Some comments may have been written by users who are authoritative on the subject, e.g., movie reviewers, and should therefore be ranked higher than comments from non-authoritative authors. The comments may be public posts, which may be visible to users who are not friends of the posting user. More information on ranking based on social signals may be found in U.S. patent application Ser. No. 14/640,461, filed 6 Mar. 2015, which is incorporated by reference.

Figure 8:
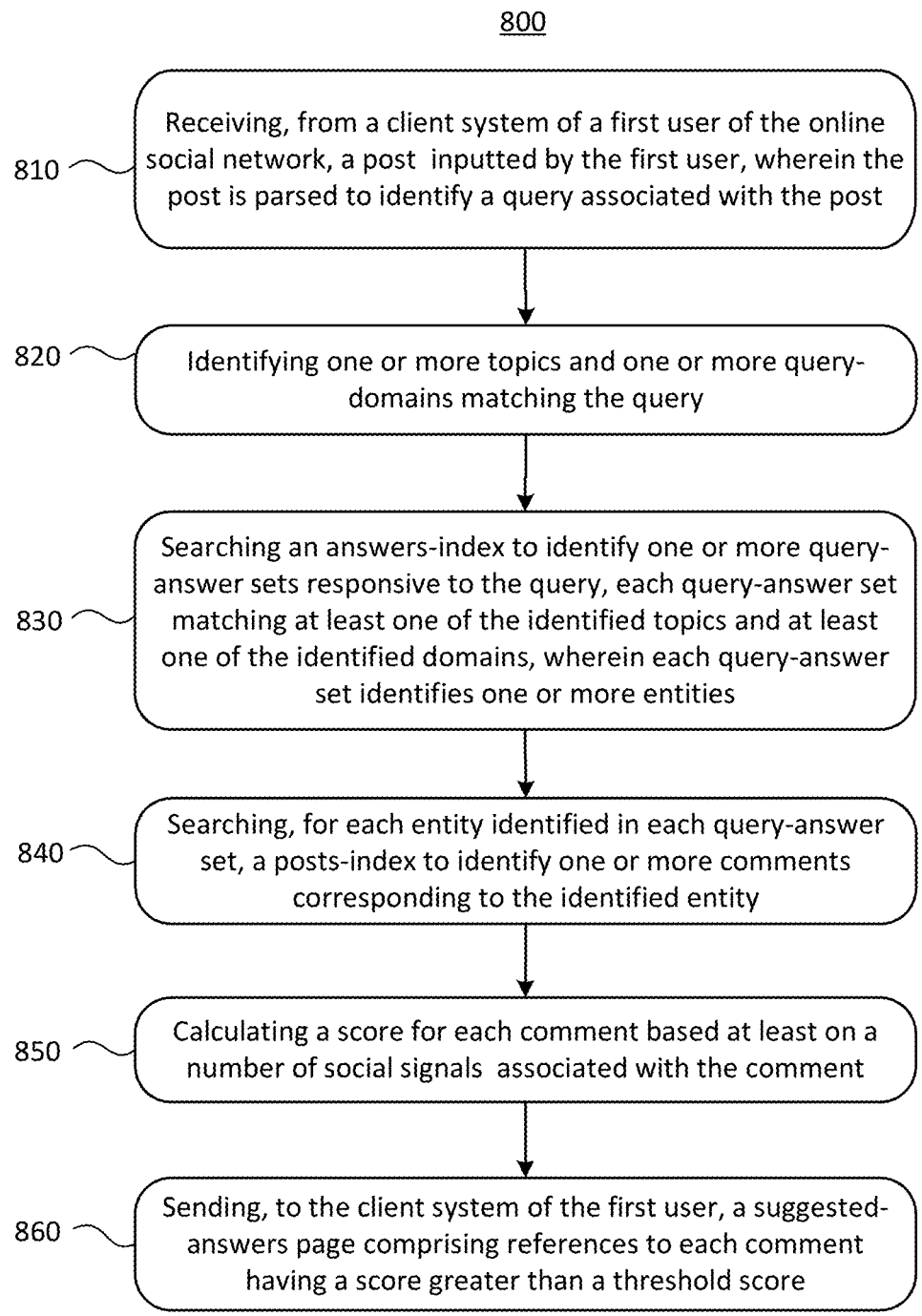
FIG. 8 illustrates an example method for identifying comments that answer a given query.

In particular embodiments, the score for each comment, e.g., as calculated at stop 850 of FIG. 8, may be further based on how many of the identified topics and identified domains are matched by the query-answer set that identifies the entity corresponding to the comment. The number of identified topics and domains that are matched by the query-answer set may be determined by the domain intersection component 328, e.g., as the number of entities in the intersection.

In particular embodiments, the social signals may include author information or location information associated with each comment. Location-based ranking may be done by mapping the location of the entity associated with the comment to a latitude/longitude, and ranking based on how close the current location of each comment's entity is to the location of the user who posted the question (e.g., whether in the scope of driving for the user).

In particular embodiments, the social signals may include affinity of the first user for each comment or affinity of the first user for an author of each comment. Comments may be ranked based on affinity of the posting user to the commenter, similarity in age group to commenter, popularity of author, and other author signals. Comments may also be ranked based on comment date (e.g., a 2-year-old comment may be less relevant than newer comments).

In particular embodiments, the search results may be displayed as answers. For example, the comment that is selected as the answer may be displayed, and the user may select the comment to view the comment's thread (e.g., the lineage of the search result). The displayed answers may include the entity, e.g., the pizza place, as well as the lineage in the post/comment thread that contains the entity. For example, the top comment that produced the entity may be displayed. The user may then click on or otherwise select the top comment to expand to view the users who commented, the post, and other comments in the thread.

Figure 3B:
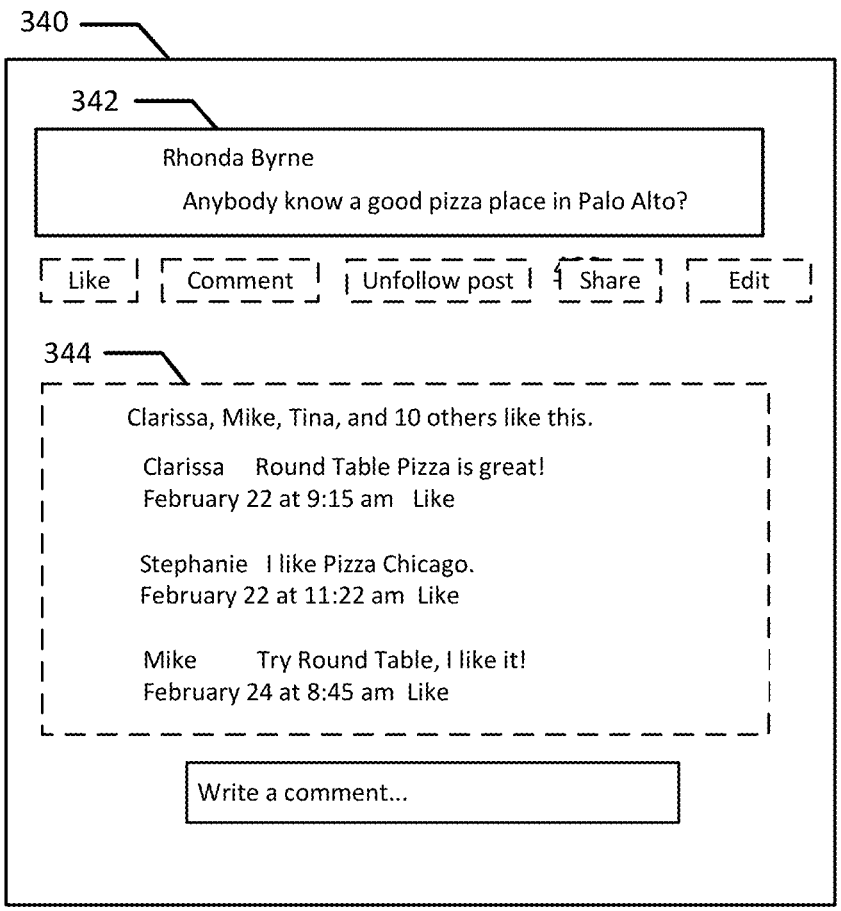
FIG. 3B illustrates an example user interface showing a comment thread in which a post asks a question about restaurants.

FIG. 3B illustrates an example user interface showing a comment thread 340 in which a post 342 asks a question about restaurants. The comments 344 provide answers to the question 342. The example question 342, posted by a user named Rhonda Byrne, is "Anybody know a good pizza place in Palo Alto?" The answers 344 to the question may include relevant comments, such as recommendations or reviews. The question 342 may include topics, e.g., "pizza" and "Palo Alto". The answers 344 may include names of entities of the social-networking system 160. The entities, e.g., "Palo Alto", may be represented by nodes of the social graph 200, e.g., by concept nodes 204 or user nodes 202 (in the case of entities that correspond to users). The question 342 and answers 344 may include names of people, which are considered entity names herein. People may be users of the social-networking system 160 and may be represented by concept nodes and/or user nodes on the social graph 200.

Figure 3C:
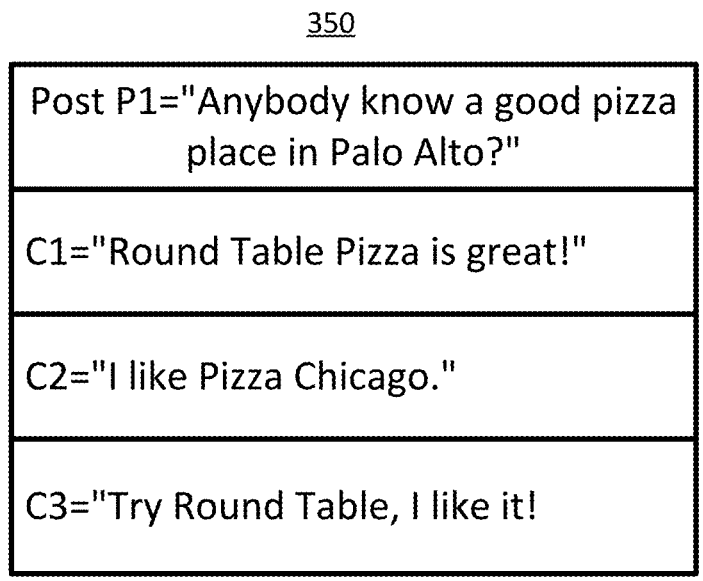
FIG. 3C illustrates an example list representing the comment thread of FIG. 3B.

For example, for the newly-asked question "What are some good pizza places in Palo Alto?", previously asked questions on similar topics may be identified by searching previous question-answer threads 340 for question posts that contain the topics named in the newly-asked question, e.g., "pizza" and "Palo Alto." For example, the user Clarissa posted "Round Table Pizza is great!" as one of the comments 406 in response to the question post 404 that refers to pizza restaurants and Palo Alto. The comment thread 340 of FIG. 3B is shown as a comment list 350 in FIG. 3C. The comment list 350 includes the question post, labeled P1, and the comments 344, labeled C1, C2, and C3. Thus, the entity "Round Table Pizza" named in the Clarissa's comment C1 may be recommended as an answer to the newly-asked question "What are some good pizza places in Palo Alto?" As an example and not by way of limitation, the identified entity "Round Table Pizza" may be presented to the posting user (e.g., the user who posted the newly-asked question), as a search result. Multiple entities that may answer the newly-asked question may be identified, e.g., multiple entities may be listed in one of the comments 406, or in multiple comments 406. For example, the comments 344 also include a comment "I like Pizza Chicago." Thus, the entity "Pizza Chicago" may also be presented as a search result. In this example, the search results include "Round Table Pizza" and "Pizza Chicago". The search results may be presented in other forms. For example, the comment thread 340, including the question 342 and the comments 344, may be presented as a search result.

In particular embodiments, the search results, which may be presented as entity names, comments, comment threads, or in other forms, may be ranked and personalized based on the identity of the user who posted the question. That user's profile, friends, and preferences, e.g., the types of restaurants the user likes, may be used to rank the search results. As an example and not by way of limitation, the ranking of search results may be based on an affinity of the posting user for the authors of the comments that provide the search results. For example, referencing FIG. 3B, if the posting user "Rhonda Byrne" has a greater affinity for Stephanie than for Clarissa, then the entity in the comment Stephanie posted ("Pizza Chicago") may be the higher-ranked entity, e.g., may be presented first in the list of search results, ahead of the entity in the comment Clarissa posted ("Round Table Pizza"). Other factors may be used to rank the search results. For example, since two of the comments 344 refer to "Round Table Pizza" and one refers to "Pizza Chicago", the search result "Round Table Pizza" may be ranked higher than "Pizza Chicago", e.g., if the posting user has the same affinity for all of the users who posted comments 344. Previously-asked questions or their comments are not necessarily relevant to the newly-asked question. In particular embodiments, such questions or comments may be excluded from the search results by, for example, comparing a domain and/or sub-domain of the newly-asked question to a domain of each previously-asked question and/or its comments.

Figure 5A:
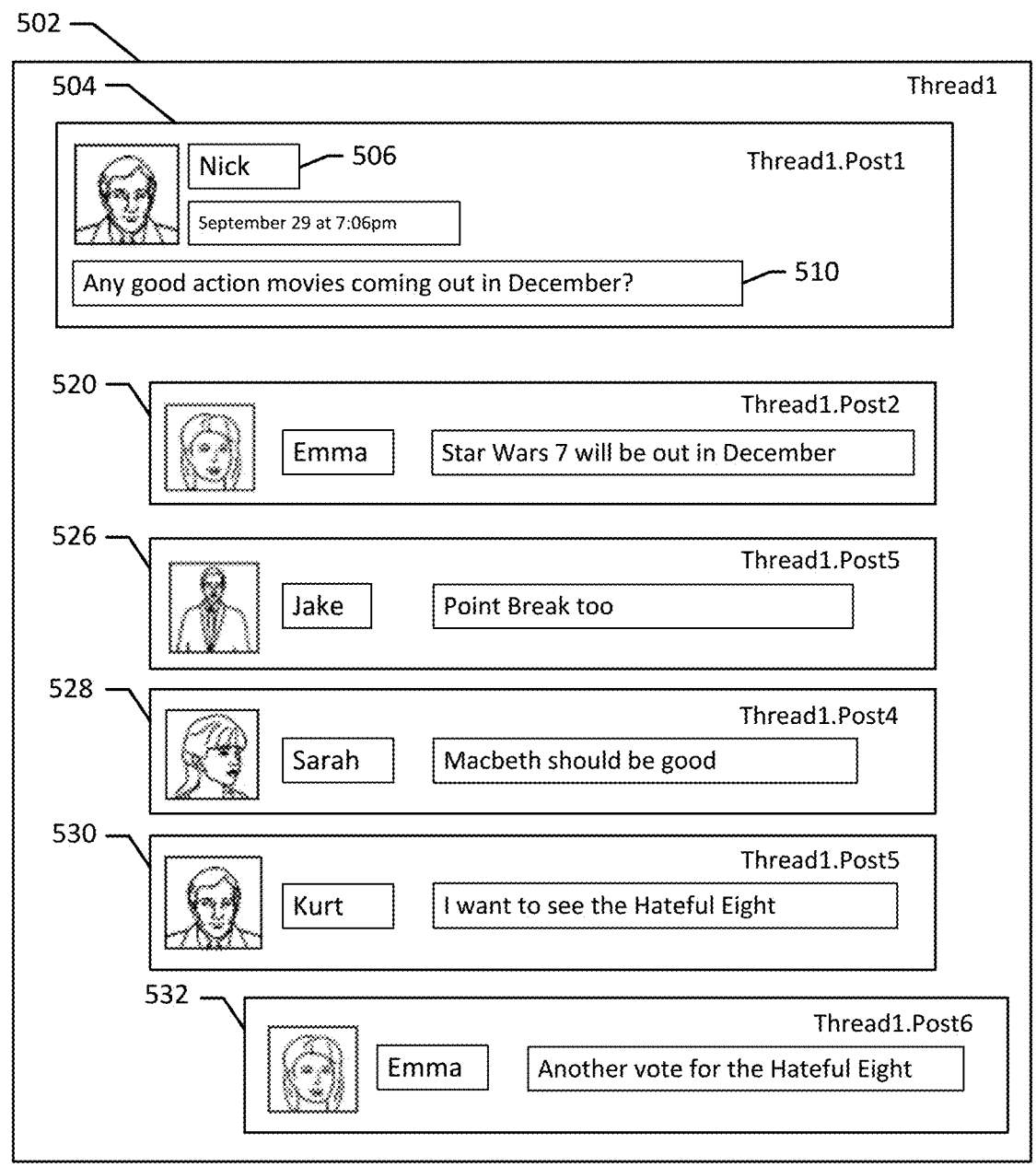
FIG. 5A illustrates an example user interface showing a comment thread in which a post asks a question about movies and comments provide answers.
Figures 5B, 5C:
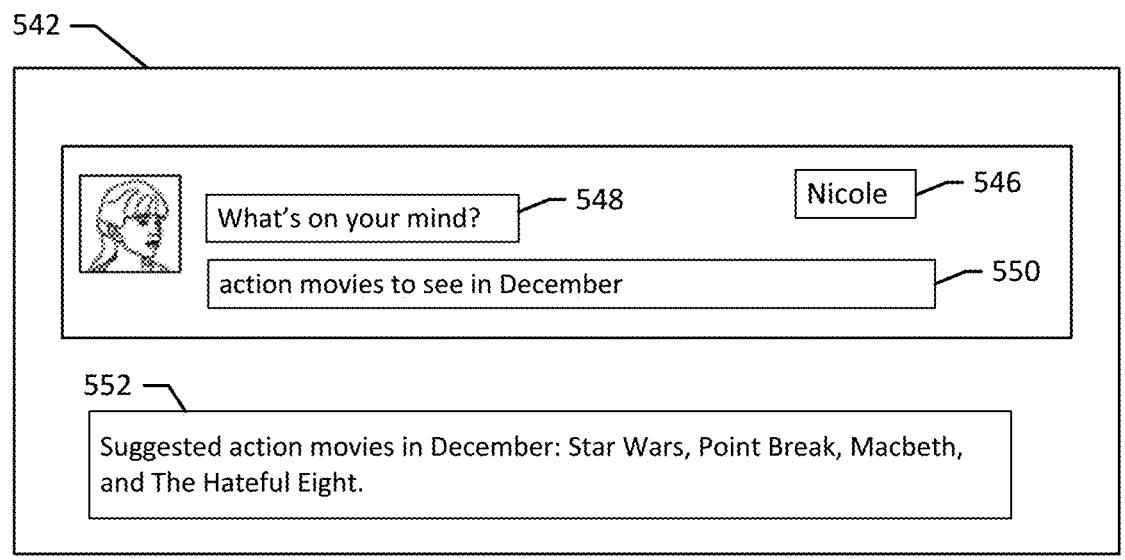
FIG. 5B illustrates an example list representing the comment thread of FIG. 5A.
FIG. 5C illustrates an example user interface showing a question asked in a status update and an answer determined using the query processor of FIG. 3.
Figure 5D:
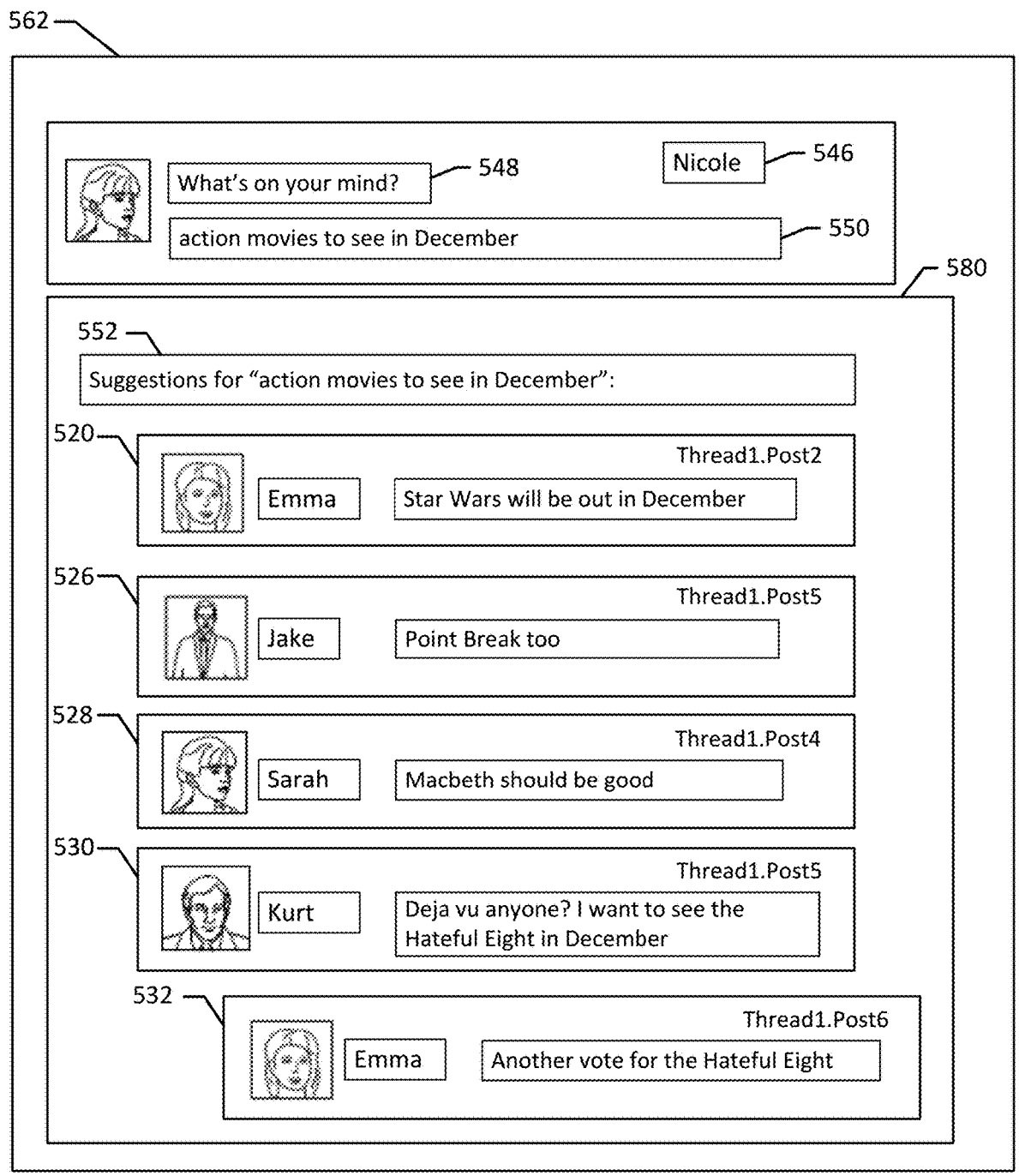
FIG. 5D illustrates an example user interface showing a question asked in a status update and answers presented as a comment thread.
Figure 5E:
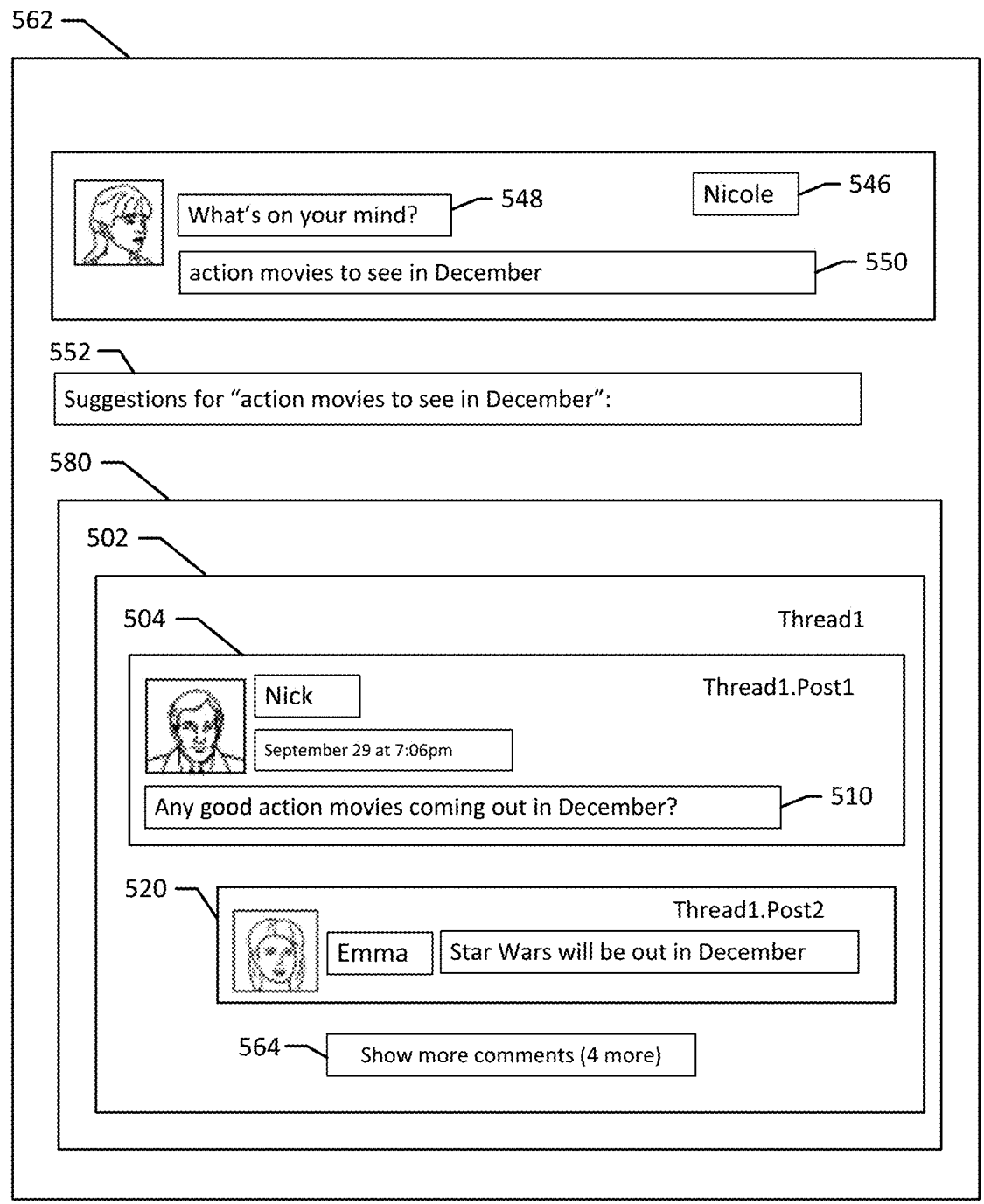
FIG. 5E illustrates an example user interface showing a question asked in a status update and answers presented as an expandable comment thread.

In particular embodiments, referencing FIGS. 5D and 5E, the social-networking system 160 may send, to the client system 130 of the first user, a suggested-answers page 580 comprising references to one or more comments 520. Each sent comment may have a calculated score greater than a threshold score. The score calculation and sending of the suggested-answers page are shown in step 850 of FIG. 8. In particular embodiments, the social-networking system 160 may include in the suggested-answers page 580 a reference to a post to which the at least one of the identified comments 520 is a response. In particular embodiments, the social-networking system 160 may include in the suggested-answers page 580 an expandable thread user interface 502 for at least one of the identified comments 520. The expandable thread user interface 502 may be configured to display the post 550 and the at least one of the identified comments 520 in response to user selection of an expand command, such as a user interface button 564. Although this disclosure describes sending search results in a particular manner, this disclosure contemplates sending search results in any suitable manner.

Figure 4A:
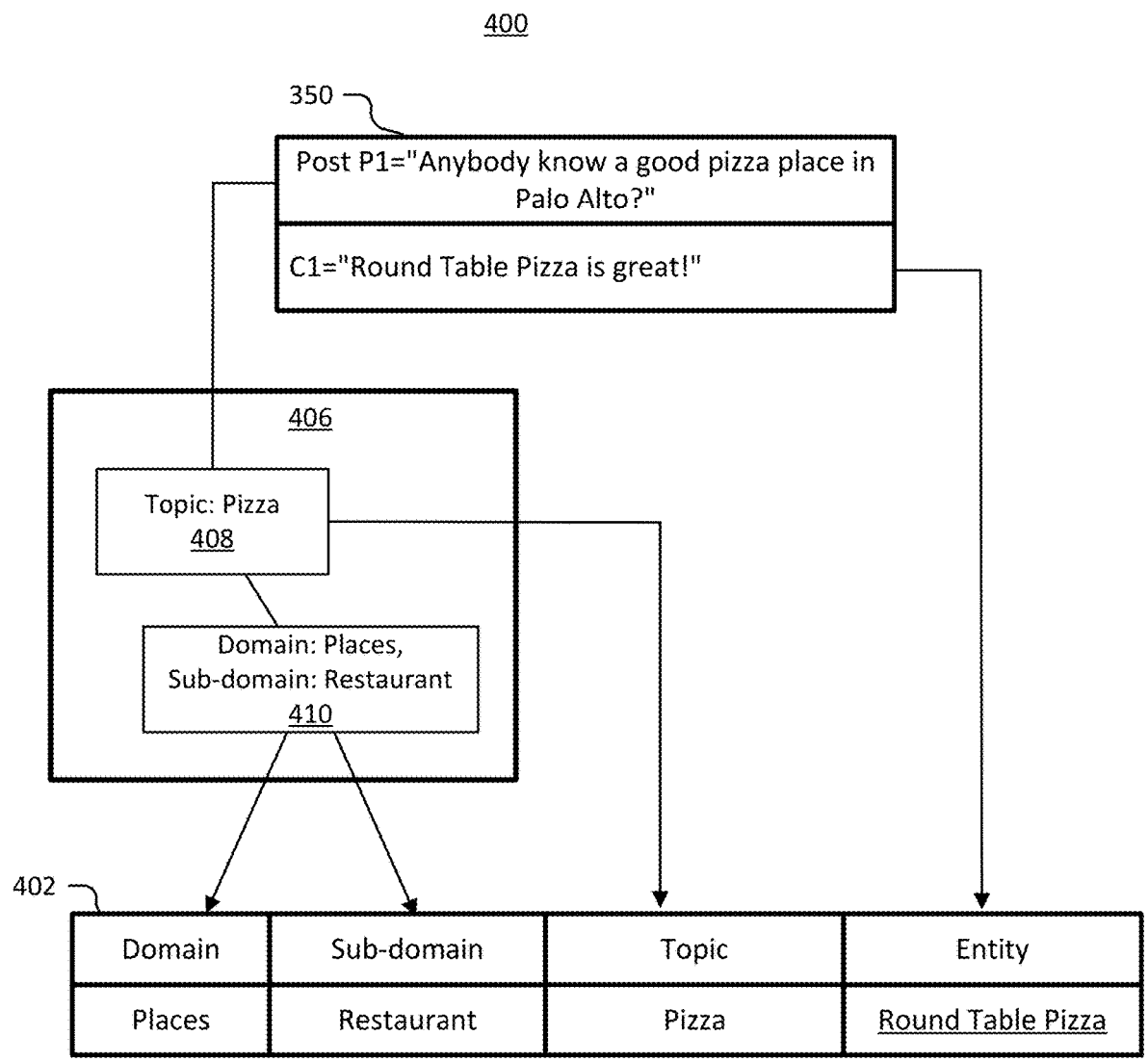
FIG. 4A illustrates an example workflow for constructing an answers-index from a post and a comment.

FIG. 4A illustrates an example workflow 400 for constructing an answers-index 402 from a post and a comment. In particular embodiments, a comment thread 350 includes a post P1 that contains a question "Anybody know a god pizza place in Palo Alto?" The comment thread 350 also includes a comment C1 "Round Table Pizza is great!" The topic tagger 304 identifies a topic "Pizza" 408 in the post P1. The domain search engine 306 identifies a domain, "Places", and a sub-domain, "Restaurant", for the topic "Pizza". These values are used to construct an entry in the answers-index 402. The answers-index entry includes Domain=Places and a Sub-domain=Restaurant, which are the values determined by the domain search engine 306. The index entry also includes a topic "Pizza" which is the topic 408. The index entry 402 also includes an entity name "Round Table Pizza", which is the name of an entity referenced in the comment C1.

Figure 4B:
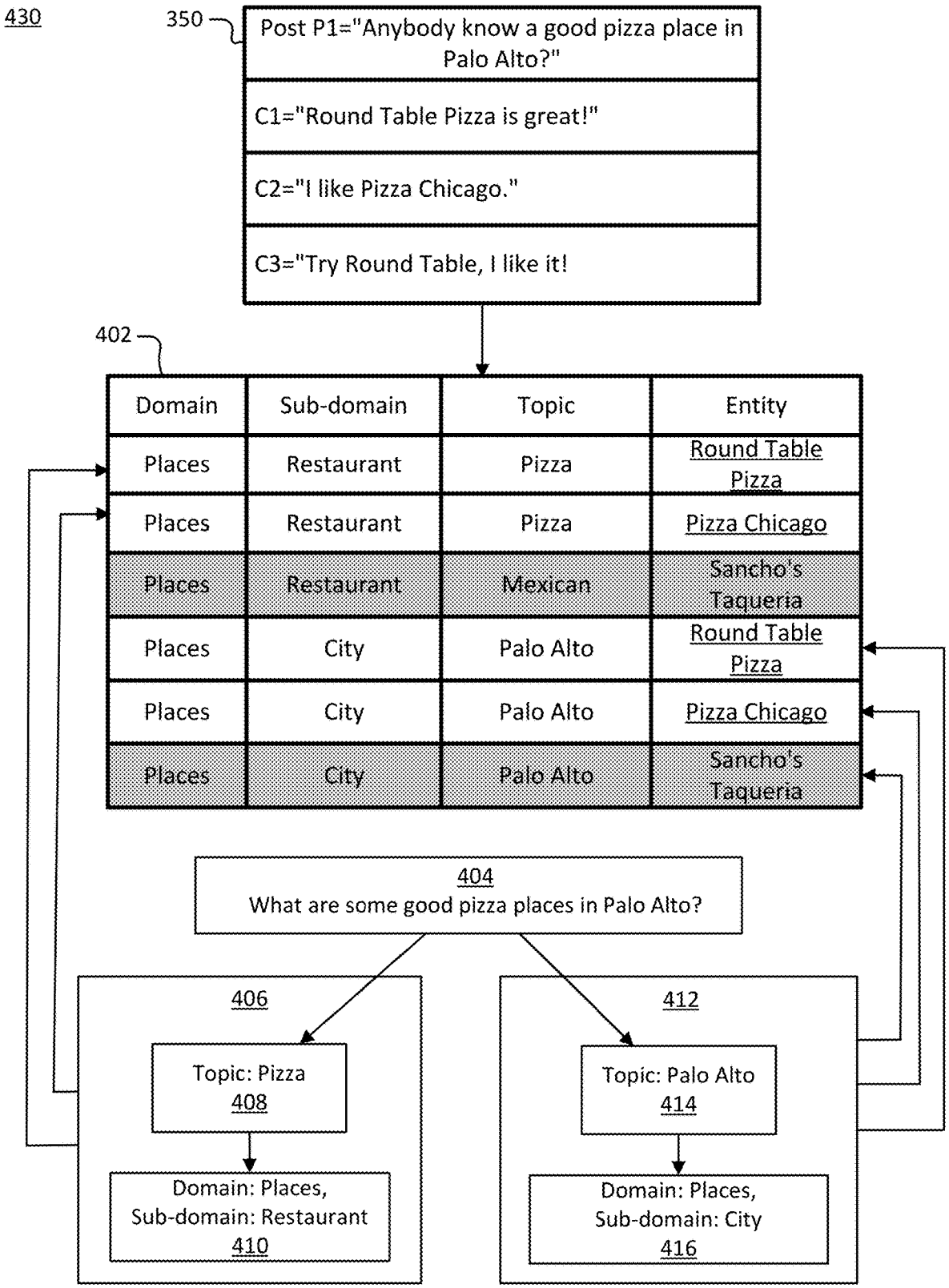
FIG. 4B illustrates an example workflow for accessing an answers-index to identify entities that answer a question.

FIG. 4B illustrates an example workflow 430 for accessing an answers-index 402 to identify entities that answer a question 404. The answers-index 402 may be constructed from a comment list 350, which includes comments C1, C2, C3 on a post P1. When a question 404 is received, the topic tagger 304 may identify the topics Pizza 408 and Palo Alto 414. Further, the domain search engine 306 may identify the domain Places and sub-domain Restaurants 410 based on the topic 408, and the Domain=Places and Sub-domain=City 416 based on the topic Palo Alto 414. In response to the question 404, the answers-index 402 is searched for entries (e.g., rows) having Domain=Places, Sub-domain=Restaurant, and topic=Pizza, which may collectively be referred to as first search criteria 406. In this example, the first search criteria is satisfied by the first two rows of the answers-index 402, which are the rows (Places, Restaurant, Pizza, Round Table Pizza) and (Places, Restaurant, Pizza, Pizza Chicago). The question 404 also includes the topic Palo Alto, for which the domain is Places and the sub-domain is City, which may collectively be referred to as second search criteria 412. The second search criteria is satisfied by the fourth through sixth rows of the answers-index 402, since those three rows have the values Domain=Places, Sub-domain=City, and topic=Palo Alto. However, only the first, second, fourth, and fifth rows satisfy both the first criteria 406 and the second criteria 412. That is, the intersection of the rows that satisfy the first search criteria 406 and the rows that satisfy the second search criteria contains the first, second, fourth, and fifth rows. Thus the entities listed in the first, second, fourth, and fifth rows, which are Round Table Pizza and Pizza Chicago, are the answers to the question 404. The comments that reference these two entities may be identified by searching a posts-index that maps entities to comments FIG. 5A illustrates an example user interface showing a comment thread 502 in which a post 504 asks a question about movies and comments 520-532 provide answers. The user interface may be presented on a client device to a user of the social-networking system 160. The post 504 asks the question 510 "Any good action movies coming out in December?" The author of the post 504 is a user named Nick 506. Comments 520-532 were posted by other users as comments on the post 504. Comment 520 states "Star Wars 7 will be out in December." Comment 526 states "Point Break too." Comment 528 states "Macbeth should be good." Comment 530 states "I want to see the Hateful Eight in November." Comment 532 states "Another vote for the Hateful Eight."

FIG. 5B illustrates an example comment list 540 representing the comment thread of FIG. 5A. The comment list 540 includes a post P2 that represents the post 504, and comments C4-C8 that represent comments 520-532, respectively.

FIG. 5C illustrates an example user interface 542 showing a question asked by a user in a status update input field 550 and an answer 552 determined using the answer generator of FIG. 3. The user interface 542 includes a newsfeed interface, which includes a prompt for status 548 ("What's on your mind?") and the name 546 ("Nicole") of the user to whom the interface 542 is presented. The user has input the question "action movie to see in December" in the status update input field 550. The generated answer, shown in an output field 552, is "Suggested action movies in December: Star Wars, Point Break, Macbeth, and The Hateful Eight."

The movies listed in the answer may correspond to entities, and the order of movies in the answer may be based on scores calculated for the entities.

FIG. 5D illustrates an example user interface showing a question asked in a status update input field 550 and answers presented as a comment thread in a suggested-answers page 580. The comment thread includes comments 520-532. The user has input the question "action movie to see in December" in the status update input field 550. The generated answer is displayed with a label 552 ("Suggestions for action movies to see in December") and is presented in the form of comments 520-532. Although the comments 520-532 are shown in the same order and format as the comment thread of FIG. 5A, they may be shown in a different order based on scores computed for each of them.

FIG. 5E illustrates an example user interface 562 showing a question asked by a user in a status update input field 550 and answers presented as a suggested-answers page 580. The suggested-answers page 580 includes an expandable comment thread 502. The expandable comment thread may be displayed initially in a default expansion state, e.g., with the post 504 and the first comment 520 displayed. The remaining comments are not displayed in the default expansion state, but may be displayed in response to selection of a user interface feature 564, which is a button labeled "Show more comments (5 more)" in this example. Alternatively, the feature 564 may have a different appearance, e.g., a plus sign. Although the post 504 and the first comment 520 are shown in the default expansion state in FIG. 5E, the post 504 may alternatively be hidden in the default state, and may be shown in response to selection of a user interface feature. The comment shown in the default state may be the highest-ranked comment according to scores calculated for the comments (e.g., as calculated at step 850 of FIG. 8), and the other comments may be displayed in an order based on their scores when the user interface feature 564 for expanding the comment thread 502 is selected. Although one comment is shown when the user interface 562 is in the initial state, a larger subset of the comment, e.g., 3, 5, 7, or other suitable number, may alternatively be shown in the initial state. A user interface feature (not shown) for collapsing all or a subset of the comment list by hiding one or more of the comments 520 and/or the post 504 may also be provided. This collapsing feature may be shown as, e.g., a minus sign associated with the comment thread 502.

FIGS. 5F-5I illustrate example lists representing comment threads in which the posts ask questions. The lists may be generated based on posts and comments received in user interfaces such as the user interface of FIG. 5A. An answers-index shown in FIG. 6B may be generated based on the comment lists shown in FIGS. 5F-5I.

In FIG. 5F, a comment list 570 includes a post P3 that asks the question "Please recommend a good dishwasher sold at Appliance World." The comment list 570 includes two comments: C9, "I can recommend the Wash-o-matic" and C10, "The Wash-o-matic." The first two entries of an example comment list 602 shown in FIG. 6B are based on the post P3 and the two comments C9 and C10. These two index entries are (Domain=Products, Sub-domain=Appliances, topic=Dishwasher, and entity=Wash-o-matic) and (Domain=Places, Sub-domain=Stores, topic=Appliance World, and entity=Wash-o-matic. The domains, sub-domains, and topics in the list 602 are from the post P3, and the entity Wash-o-matic is from the comments C9 and C10.

In FIG. 5G, a comment list 572 includes a post P4 that asks the question "What are some good hotels near LaGuardia airport in New York City?" The comment list 572 includes a comment C11, "Try LaGuardia Suites. It's great." The third and fourth entries of the example comment list 602 shown in FIG. 6B are based on the post P4 and the comment C11. These two index entries are (Domain=Places, Sub-domain=Accommodations, topic=Airport, and entity=LaGuardia Suites) and (Domain=Places, Sub-domain=City, topic=New York City, and entity=LaGuardia Suites. The domains, sub-domains, and topics in the corresponding entries in the list 602 are from the post P4, and the entity LaGuardia Suites is from the comment C11.

In FIG. 511, a comment list 574 includes a post P5 that asks the question "Who was the actor in American Sniper?" The comment list 574 includes a comment C12, "Bradley Cooper. He's a good actor." The fifth and sixth entries of the example comment list 602 shown in FIG. 6B are based on the post P5 and the comment C12. These two index entries are (Domain=People, Sub-domain=Actors, topic=Male, and entity=Bradley Cooper) and (Domain=People, Sub-domain=Actors, topic=American Sniper, and entity=Bradley Cooper). The domains, sub-domains, and topics in the corresponding entries in the list 602 are from the post P5, and the entity Bradley Cooper is from the comment C12.

In FIG. 5I, a comment list 576 includes a post P6 that asks the question "What are some news stories about terrorism in 2015?" The comment list 576 includes a comment C13, "The shooting down of the Russian civilian airplane." The seventh and eighth entries of the example comment list 602 shown in FIG. 6B are based on the post P6 and the comment C13. These two index entries are (Domain=Media, Sub-domain=News, topic=2015, and entity=Russian Airplane) and (Domain=Media, Sub-domain=News, topic=New York City, and entity=Russian Airplane). The domains, sub-domains, and topics in the corresponding entries in the list 602 are from the post P6, and the entity Russian Airplane is from the comment C13.

FIGS. 6A and 6B illustrate example answers-indexes that map domains and topics to entities referenced in comments on posts that are related to the domains and topics. The answers-index 600 of FIG. 6A may be generated by the answers-index generator 308 or the method of FIG. 9 based upon the comment thread of FIG. 5A, which is shown as a comment list 540 in FIG. 5B. The comment list 540 includes a post P2, "Any good action movies coming out in December?" and five comments containing names of movie entities. The answers-index 600 includes four entries. The domains, sub-domains, and topics of the index entries are from the post P2. The entities of the index entries are from the posts C4-C8. The answers-index entry is (Domain=Media, Sub-domain=Movie, Topic=Action, and entity=Star Wars 7), and is based on the post P2 and the comment C4 ("Star Wars 7 will be out in December"). The domain Media and sub-domain Movie are determined from the topic action in the post P2. The topic Action in each index entry is from the post P2, and the entity Star Wars 7 is from the comment C4. The posts-index entry is (Media, Movie, December, Star Wars 7). December is from the post P2, and Star Wars 7 is from the comment C4. The third index entry is (Media, Movie, Action, Point Break). The entity Point Break is from the comment C5. The remaining index entries in the index 600 are similarly determined, with two entries for each comment. The two entries both refer to the entity identified by the comment. One of the two entries for each comment has topic Action, and the other has topic December, both of which are from the post P2. The answers-index of FIG. 6B is described above with reference to FIGS. 5F-5I.

FIGS. 7A and 7B illustrate example posts-indexes that map entities to comments that reference the entities. The posts-indexes may be generated by the posts-index generator 310 or the method of FIG. 9. The posts-index 700 of FIG. 7A may be generated based on the comment thread 340 of FIG. 3B, which is shown as a comment list 350 of FIG. 3C. The entity in the entity column for each of the index entries may be from a comment (in the comment thread 340) that is a response to a post identified by the answers-index generator 308 or the method of FIG. 9. The first two entries in the index 700 of FIG. 7A, for the entities Round Table Pizza and Pizza Chicago, associate those entities with comments in which the entities appear: C1 and C3 for Round Table Pizza, and C2 for Pizza Chicago. The remaining entries in the index 700 may be generated based on the comment thread 502 of FIG. 5A, which is shown as a comment list 540 in FIG. 5B. For example, the third entry, which associates the entity Star Wars 7 with the comment C4, may be based on the comment C4, "Star Wars 7 will be out in December. which identifies the entity Star Wars 7. Similarly, the fourth entry associates the entity Point Break with the comment C5, "Point Break too." The fifth entry associates the entity Macbeth with the comment C6, "Macbeth should be good." The sixth entry associates the entity Hateful Eight with the comment C7, "I want to see the Hateful Eight." The seventh entry associates the entity Hateful Eight with the comment C8, "Another vote for the Hateful Eight."

The posts-index 702 of FIG. 7B may be generated based on the comment lists 570, 572, 574, 576 of respective FIGS. 5F-5I. The entity in the entity column for each of the entries of the index 702 may be from a comment (in the comment thread 340) that is a response to an associated post (which may be identified by the answers-index generator 308 or the method of FIG. 9) associated with the comment by each comment list in FIGS. 5F-5I. The first two entries in the index 702 of FIG. 7B associate the entity Wash-o-matic with the C9 and C10 comments in which Wash-o-matic is mentioned. Comment C9 is "I can recommend the Wash-o-matic." Comment C10 is "The wash-o-matic. It's sold at Appliance World." The third entry in the index 702 associates the entity Appliance World with comment C10, in which Appliance World is mentioned. The fourth entry associates the entity LaGuardia Suites with the comment C11, "Try LaGuardia Suites. It's great." The fifth entry associates the entity Bradley Cooper with the comment C12, "Bradley Cooper. He's a good actor." The sixth entry associates the entity Russian Airplane with the comment C13, "The shooting down of the Russian airplane."

FIG. 8 illustrates an example method 800 for identifying comments that answer a given query. The method may begin at step 810, where the social-networking system 160 may receive, from a client system of a first user of the online social network, a post inputted by the first user, wherein the post is parsed to identify a query associated with the post. At step 820, the social-networking system 160 may identify one or more topics and one or more query-domains matching the query. At step 830, the social-networking system 160 may search an answers-index to identify one or more query-answer sets responsive to the query, each query-answer set matching at least one of the identified topics and at least one of the identified domains, wherein each query-answer set identifies one or more entities. At step 840, the social-networking system search, for each entity identified in each query-answer set, a posts-index to identify one or more comments corresponding to the identified entity. At step 850, the social-networking system 160 may calculate a score for each comment based at least on a number of social signals associated with the comment. At step 860, the social-networking system 160 may send, to the client system of the first user, a suggested-answers page comprising references each comment having a score greater than a threshold score.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for identifying comments that answer a given query including the particular steps of the method of FIG. 8, this disclosure contemplates any suitable method for identifying comments that answer a given query including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
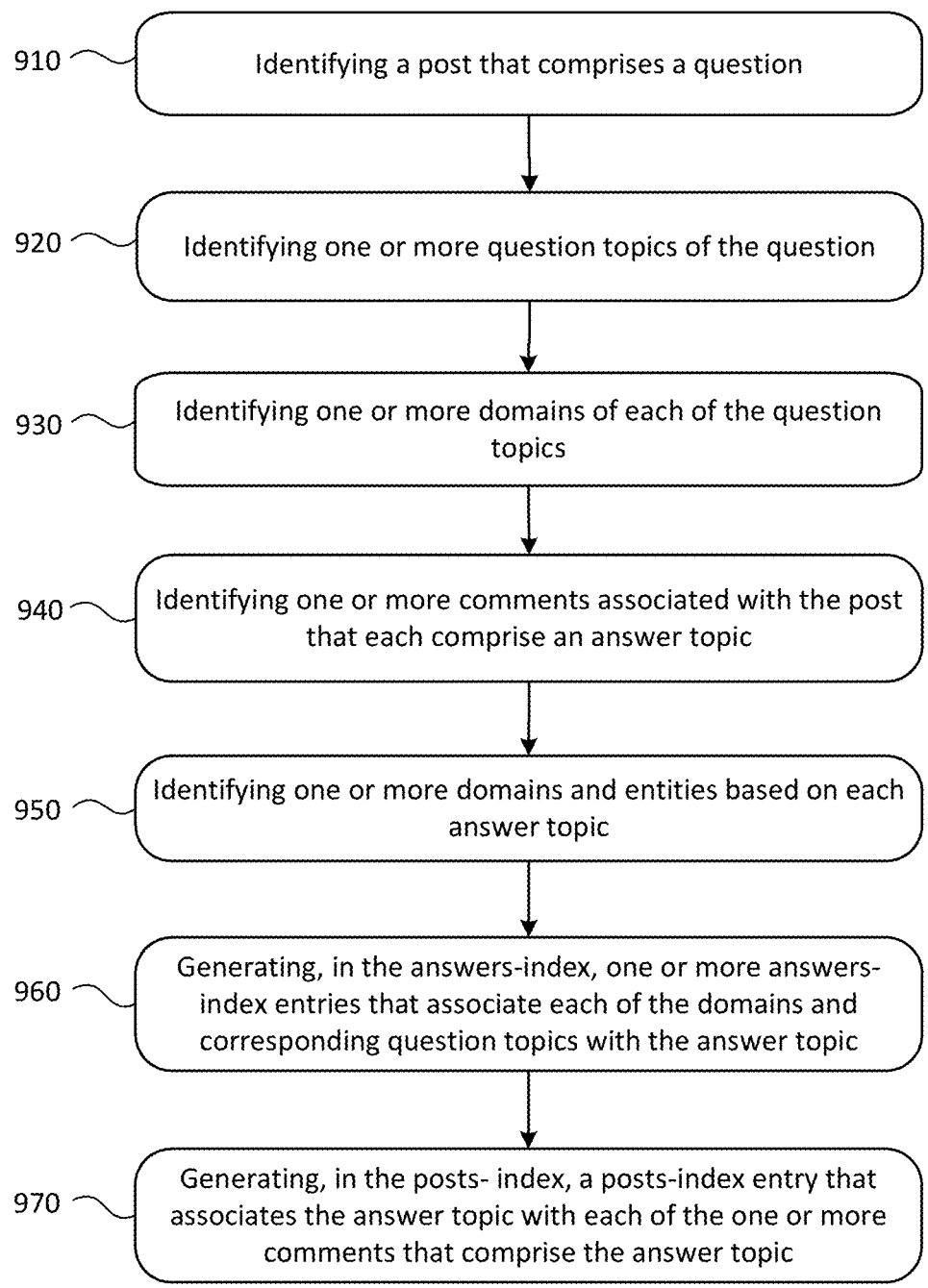
FIG. 9 illustrates an example method for generating an answers-index that maps domains and topics to entities referenced in comments, and a posts-index that maps entities to comments that reference the entities.

FIG. 9 illustrates an example method 900 for generating an answers-index that maps domains and topics to entities referenced in comments, and a posts-index that maps entities to comments that reference the entities. The method may begin at step 910, where the social-networking system 160 may identify a post that comprises a question. At step 920, the social-networking system 160 may identify one or more question topics of the question. At step 930, the social-networking system 160 may identify one or more domains of each of the question topics. At step 940, the social-networking system 160 may identify one or more comments associated with the post that each comprise an answer topic. At step 950, the social-networking system 160 may identify one or more domains of each answer topic. At step 960, the social-networking system 160 may generate, in the answers-index, one or more answers-index entries that associate each of the domains and corresponding question topics with the answer topic. At step 970, the social-networking system 160 may generate, in the posts-index, a posts-index entry that associates the answer topic with each of the one or more comments that comprise the answer topic. Further, the social-networking system 160 may identify an answer entity that corresponds to the answer topic, e.g., by searching a social graph for an entity having a name that matches the answer topic. The posts-index entry may associate the corresponding entity with each of the comments that comprise the answer topic. The answer-index entry may associate each of the domains and corresponding question topics with the answer entity.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for generating the answers-index and posts-index including the particular steps of the method of FIG. 9, this disclosure contemplates any suitable method for generating the answers-index and posts-index including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part by a history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 10:
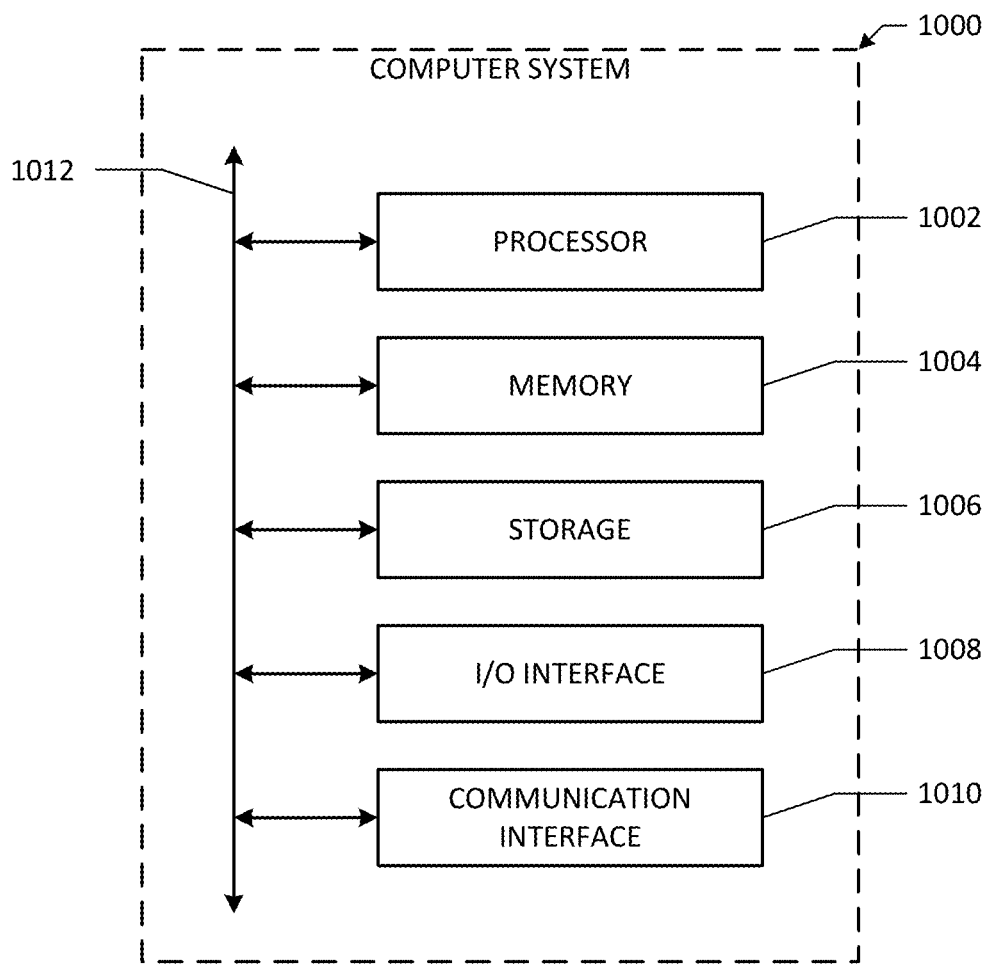
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices of an online social network:
    receiving, from a client system of a first user of the online social network, a post inputted by the first user, wherein the post is parsed to identify a query associated with the post;
    identifying one or more topics and one or more query-domains matching the query;
    searching an answers-index to identify one or more query-answer sets responsive to the query, each query-answer set matching at least one of the identified topics associated with the query and at least one of the identified domains associated with the query, wherein each query-answer set identifies one or more entities;
    searching, for each entity identified in each query-answer set, a posts-index to identify one or more comments corresponding to the identified entity, wherein the posts-index maps a plurality of entity identifiers of a plurality of entities, respectively, to a plurality of comment identifiers of a plurality of comments, respectively, the comments being responses to posts of the online social network;
    calculating, for each comment identified from the posts-index, a score for the comment based at least on a number of social signals associated with the comment; and
    sending, to the client system of the first user, a suggested-answers page comprising references to each comment having a score greater than a threshold score, wherein each comment is responsive to the query associated with the post.

2. The method of claim 1, further comprising determining, using natural-language processing, that the query is a question in a natural language syntax.

3. The method of claim 1, wherein identifying the one or more topics of the query comprises using a topic tagger to identify the topics based on the query.

4. The method of claim 1, wherein the query-domains are identified by searching a knowledge base that associates topics with query-domains.

5. The method of claim 1, wherein receiving, from a client system of a first user of the online social network, a query comprises receiving a post that includes the query.

6. The method of claim 1, further comprising:
    accessing a social graph comprising a plurality of nodes and a plurality of edges connecting the nodes, each of the edges between two of the nodes representing a single degree of separation between them, the nodes comprising:
a first node corresponding to a first user associated with an online social network; and
a plurality of second nodes that each correspond to a concept or a second user associated with the online social network.

7. The method of claim 1, the suggested-answers page further comprising a reference to a post to which the at least one of the identified comments is a response.

8. The method of claim 7, wherein the suggested-answers page comprises an expandable thread user interface for at least one of the identified comments, and the expandable thread user interface is configured to display the post and the at least one of the identified comments in response to user selection of an expand command.

9. The method of claim 1, wherein each query-answer set matches all of the identified topics and identified domains.

10. The method of claim 1, further comprising ranking the comments based on the score associated with each comment.

11. The method of claim 10, wherein the score for each comment is further based on how many of the identified topics and identified domains are matched by the query-answer set that identifies the entity corresponding to the comment.

12. The method of claim 1, wherein the social signals comprise author information or location information associated with each comment.

13. The method of claim 1, wherein the social signals comprise affinity of the first user for each comment or affinity of the first user for an author of each comment.

14. The method of claim 1, further comprising:
identifying a post by a second user that comprises a query;
identifying one or more query topics of the query;
identifying one or more query-domains of each of the query topics;
identifying one or more comments associated with the post by the second user, wherein the comments each comprise an answer topic; and
generating, in the answers-index, one or more answers-index entries that associate each of the domains and corresponding question topics with the answer topic.

15. The method of claim 14, further comprising identifying an answer entity that corresponds to the answer topic by searching a social graph for the answer entity, wherein a name of the answer entity corresponds to the answer topic, and the one or more answers-index entries associate each of the domains and corresponding question topics with the answer entity.

16. The method of claim 14, further comprising:
identifying one or more answer-domains of each answer topic; and
determining that the query-domains match the answer-domains,
wherein the generating, in the answers-index, the one or more answers-index entries is conditional upon the query-domains of each query topic matching the answer-domains of each answer topic.

17. The method of claim 14, further comprising generating, in the posts-index, a posts-index entry that associates the answer topic with each of the one or more comments that comprise the answer topic.

18. The method of claim 17, wherein the answer topic corresponds to an entity, and the posts-index entry associates the corresponding entity with each of the one or more comments that comprise the answer topic.

19. One or more computer-readable non-transitory storage media embodying software that is operable when executed to:
receive, from a client system of a first user of an online social network, a post inputted by the first user, wherein the post is parsed to identify a query associated with the post;
identify one or more topics and one or more query-domains matching the query;
search an answers-index to identify one or more query-answer sets responsive to the query, each query-answer set matching at least one of the identified topics associated with the query and at least one of the identified domains associated with the query, wherein each query-answer set identifies one or more entities;
search, for each entity identified in each query-answer set, a posts-index to identify one or more comments corresponding to the identified entity, wherein the posts-index maps a plurality of entity identifiers of a plurality of entities, respectively, to a plurality of comment identifiers of a plurality of comments, respectively, the comments being responses to posts of the online social network;
calculate, for each comment identified from the posts-index, a score for the comment based at least on a number of social signals associated with the comment; and
send, to the client system of the first user, a suggested-answers page comprising references to each comment having a score greater than a threshold score, wherein each comment is responsive to the query associated with the post.

20. A system comprising: one or more processors; and a non-transitory memory coupled to the processors comprising instructions executable by the processors, the processors operable when executing the instructions to:
receive, from a client system of a first user of an online social network, a post inputted by the first user, wherein the post is parsed to identify a query associated with the post;
identify one or more topics and one or more query-domains matching the query;
search an answers-index to identify one or more query-answer sets responsive to the query, each query-answer set matching at least one of the identified topics associated with the query and at least one of the identified domains associated with the query, wherein each query-answer set identifies one or more entities;
search, for each entity identified in each query-answer set, a posts-index to identify one or more comments corresponding to the identified entity, wherein the posts-index maps a plurality of entity identifiers of a plurality of entities, respectively, to a plurality of comment identifiers of a plurality of comments, respectively, the comments being responses to posts of the online social network;
calculate, for each comment identified from the posts-index, a score for the comment based at least on a number of social signals associated with the comment; and
send, to the client system of the first user, a suggested-answers page comprising references to each comment having a score greater than a threshold score, wherein each comment is responsive to the query associated with the post.

\* \* \* \* \*